Figure 1:
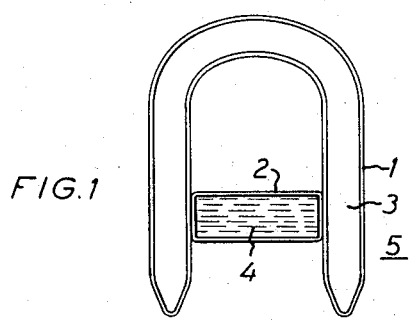

United States Patent [19]
Törnmarck et al.

[11] 3,868,218
[45] Feb. 25, 1975

[54] METHODS AND DEVICES FOR AUTOMATICALLY ACTIVATING A CHEMICAL PROCESS AT A GIVEN TEMPERATURE

[75] Inventors: Sven Ivan Arvid Törnmarck, Malmo; Per Olof Andersson, Staffanstorp, both of Sweden

[73] Assignee: Food Control AB, Malmo, Sweden

[22] Filed: Feb. 17, 1972

[21] Appl. No.: 227,028

[30] Foreign Application Priority Data
Feb. 18, 1971 Sweden............................ 2082/71

[52] U.S. Cl................ 23/230 R, 23/253 R, 23/259, 73/368.3, 116/114.5, 206/219, 426/88
[51] Int. Cl...................... G01n 31//00, G01k 1/02
[58] Field of Search..................... 423/659, 88, 383; 73/368.3, 358; 23/253 TP, 230 R, 259, 253 R; 116/114.5; 206/47 A, 219

[56] References Cited
UNITED STATES PATENTS

| | | | |
|---|---|---|---|
| 2,662,018 | 12/1953 | Smith............................ | 116/114.5 X |
| 3,090,236 | 5/1963 | Nicol............................ | 116/114.5 X |
| 3,177,843 | 4/1965 | Geocaris....................... | 426/88 X |
| 3,234,793 | 2/1966 | Vernet........................... | 73/368.3 |
| 3,446,596 | 5/1969 | Salivar et al.................. | 23/253 TP |

Primary Examiner—Joseph Scovronek
Assistant Examiner—Arnold Turk
Attorney, Agent, or Firm—Browne, Beveridge, DeGrandi & Kline

[57] ABSTRACT

A method and a device for automatically activating a chemical process at a given temperature, said method and device being characterized in that the substances participating in the process are kept separate prior to activation by separating means which are caused, by means of an activator which at the activation temperature undergoes a change of phase associated with a change in volume, to rupture or change their shape during activation so that the substances participating in the process are bought into contact with one another.

10 Claims, 3 Drawing Figures

PATENTED FEB 25 1975 3,868,218 though the invention is not limited to these examples, the skilled addressee will realise that the invention can be applied in many connections to achieve an automatic activation of a chemical process at a given temperature.

METHODS AND DEVICES FOR AUTOMATICALLY ACTIVATING A CHEMICAL PROCESS AT A GIVEN TEMPERATURE

The present invention relates to a method and a device for automatically activating a chemical process at a given temperature, the activation being carried out by bringing the substances participating in the process into contact with one another.

Among prior art methods of activating a chemical process by bringing the substances participating in the process into contact with one another, there may be mentioned the application of pressure to one or more strips on which the substances are disposed, by passing the strips between pressure rolls. One or more of these substances may be contained in capsules which rupture under the pressure exerted by the rolls. However, such activation is initiated manually and is not automatic.

From U.S. Pat. No. 2,982,396 and British Patent Specification No. 967,928 it is previously known, in connection with substances reacting with one another, to keep the substances separate prior to activation of the reaction, by means of a solid or semisolid barrier layer which is destroyed and mixed with the final product during the reaction. However, the reaction is not activated automatically, and instead — for instance when the reaction of the two substances is exothermal — the barrier layer is first penetrated mechanically so that the substances can come into contact with one another under reaction and development of heat, and the developed heat causes the barrier layer to melt and mix with the final product.

U.S. Pat. No. 2,681,168 discloses a device for encapsulating and dispensing a substance, for instance a dye solution. The device comprises an outer elastic casing and a fragile capsule disposed therein which preferably consists of gelatin treated with formaldehyde, said capsule containing the substance in question. From the device of the present invention, this prior art device differs in that it is not intended for automatic activation, and the contents of the capsule are dispensed by manually grasping the device and crushing the capsule. Furthermore, this prior art device is so formed that it dispenses the capsule contents in a predetermined direction.

The present invention proposes a novel method and device for automatically activating a chemical process at a given temperature. The invention is based upon the change in volume obtainable when a substance undergoes a change of phase, for instance from gas to liquid or from liquid to solid phase.

The present invention thus relates to a method of automatically activating, at a given temperature, a chemical process where the participating substances are kept separate prior to activation by separating means and, upon activation, are brought into contact with one another, the method being characterised in that an activator consisting of a medium encapsulated in a wholly or partly elastic container and subject to a change of phase associated with a change in volume is caused, at activation temperature, by said change in volume and while maintaining the container intact, to act upon the separating means so that the participating substances are brought into contact with one another, and the process is activated.

The invention also relates to a device for carrying the above-mentioned method into effect, said device comprising separating means for keeping the substances participating in the process separate prior to activation, and the device is characterised in that it also comprises an activator consisting of a wholly or partly elastic container enclosing a medium which at activation temperature undergoes a change of phase associated with a change in volume, thereby to act upon the separating means, while maintaining the container intact, so that communication is established between the participating substances for activating the process.

The invention will now be described in more detail in the following, reference being had to the accompanying drawing. The following embodiments are not intended to restrict the invention and are for illustrative purposes only.

Figure 2:
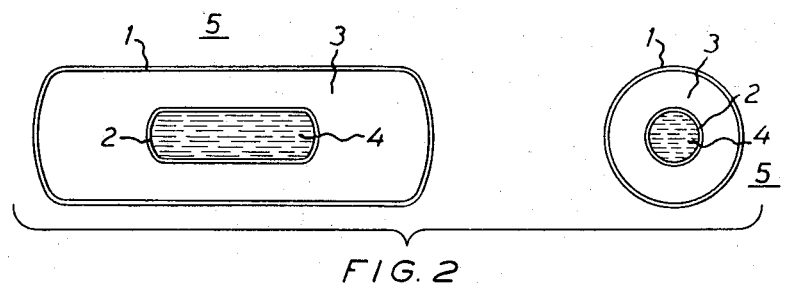
Figure 3:
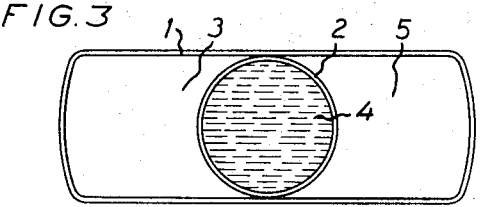

In the drawing:

FIGS. 1–3 illustrate preferred devices for carrying the method of the present invention into effect.

FIG. 1 shows a horseshoe-shaped fragile capsule 1 of glass or other material, for instance a fragile plastics material. The capsule 1 contains a substance 3 which is intended to react with a substance 5 surrounding said capsule 1. To initiate the reaction, the substances 3 and 5 must be brought into contact with one another. The reaction need not occur instantly upon contact between the substances 3 and 5, but may be delayed with respect to time and temperature; in other words, the process can be activated at a given low temperature, without any reaction taking place, and the desired reaction will then occur after a period of elevated temperature. An activator which consists of a medium 4, such as water, enclosed in a casing 2 of e.g. plastics material, engages the inside of the legs of the horseshoe-shaped capsule. A freezing point reducing agent can be added to the water. When the temperature is lowered to 0° C or below, the water in the activator will freeze and thereby increase in volume. Because the casing 2 is elastic at the end faces engaging the capsule 1, but rigid and non-elastic at the other surfaces, the increase in volume will be converted into an increase in pressure which acts upon the capsule 1 and causes it to rupture. The substance 3 previously enclosed within the capsule 1 and having a lower freezing point than water will then escape and contact the substance 5, and the desired reaction can now be initiated.

FIG. 2 shows a device, corresponding to that shown in FIG. 1, where the activator has been positioned within the capsule 1 to cause the capsule to rupture under the action of an inside pressure so that the reacting substances 3 and 5 will come into contact with one another. As in FIG. 1, the activator is a medium 4, such as water, enclosed in a casing 2. In the embodiment according to FIG. 2, however, the entire casing 2 is formed of elastic material.

FIG. 3 shows a further embodiment where the activator, like a FIG. 2, is provided within the capsule 1, but in such a manner that it fills out the entire cross section of the capsule 1 and forms a plug therein. The reacting substances 3 and 5 are located on either side of the activator which in this case at the same time acts as a separator keeping the reacting substances apart. Like in the earlier embodiments, the capsule 1 in other respects consists of a fragile material, such as glass, and the capsule 2 consists of an elastic material, such as a plastics material. If the medium within the capsule 2 is e.g. water, the capsule 1 will rupture when the water freezes, and the reacting substances 3 and 5 are brought into contact with one another. It is also conceivable that the medium in the capsule 2 is a substance which is present in gaseous form, such as ether, and that the gas, when the temperature is lowered, is condensed to liquid, whereby the elastic capsule 2 reduces its volume so that the reacting substances 3 and 5 are brought into contact with one another.

A preferred utility of the present invention is the activation of a foodstuff indicator according to U.S. Pat. application Ser. No. 19,033 filed Mar. 12, 1970, the applicants being Stellan Ljungberg and Karl Alof Alm, now abandoned, where the substances participating in the indication process consist of an enzyme, a substrate, an indicator and, if desired, a buffer. For this purpose the embodiment of FIG. 2 may be utilized, the enzyme comprising the substance 3 and the substrate, the indicator and, optionally, the buffer comprising the substance 5. This indicator device, including the container 2 with the activator medium 4, is positioned on a foodstuff package, for instance before freezing in the production of deep-frozen foodstuffs. When the package with the indicator positioned thereon is then introduced into the freezing machine, the indicator is activated as the activator medium undergoes a phase transition increasing its volume whereby it exerts a sufficient pressure on the capsule 1 to effect bursting of the same. The several substances of the indicating device are then in contacting relationship with each other and capable of reacting to indicate if the foodstuff is exposed to unsuitable time-temperature conditions.

It should be observed that the present invention is not restricted to the above-mentioned application, and that other fields of application are possible, where one utilises the change in volume which is obtained when a medium is subjected to a change of phase.

What we claim and desire to secure by Letters Patent is:

1. A method of automatically combining chemical substances at a given temperature, one of said substances being disposed in a first container and the other being disposed outside of said container so that said substances are separated by a fragile wall of said container, comprising the steps of,
   providing an activator of a different substance than said two substances which at said given temperature undergoes a phase transition thereby increasing its volume, which activator is encapsulated in a second container located in proximity to said fragile wall of said first container and being at least partly elastic so as to be expandible without breaking,
   and subjecting said activator to said given temperature whereby it undergoes said increasing volume change and breaks said wall of said first container so that the two chemical substances are immediately brought into contact with each other.

2. A device for automatically combining chemical substances at a given temperature comprising separating means for keeping such substances separate from each other before said given temperature is reached, said separating means including both an activator consisting of an activator medium encapsulated in an at least partly elastic container and a rupturable container in contact with said activator, said activator medium undergoing a phase transition when said given temperature is reached, said activator thereby changing its volume and rupturing said rupturable container so that communication between said substances is established, said elastic container being sufficiently elastic to remain intact at said volume change.

3. A device for automatically combining two chemical substances at a given temperature comprising, a first container which encloses one of said substances, said container having a fragile wall and the second of said substances being disposed outside of said wall, a second container located in proximity to said wall of said first container and containing an activator of a different substance than said two substances which changes its phase thereby increasing its volume at said given temperature, said second container being at least partly elastic so as to be expandible without breaking, whereupon when said given temperature is reached said second container expands and breaks said wall thereby establishing immediate communication between said two substances.

4. A device as claimed in claim 3 wherein said first container is a horseshoe-shaped container and said second container is disposed between the legs of said horseshoe.

5. A device as claimed in claim 3 characterized in that said activator is solid at said given temperature while it is liquid at temperatures at least immediately above said given temperature.

6. A device as claimed in claim 1 characterized in that said activator is water.

7. A device as claimed in claim 6 characterized in that a freezing point-reducing agent has been added to the water.

8. A device as claimed in claim 3 wherein said second container is disposed inside of said first container.

9. A device as claimed in claim 8 wherein the shapes of said containers are identical.

10. A device as claimed in claim 9 wherein said containers are cylindrical.

* * * * *